(12) United States Patent
Tiemann et al.

(10) Patent No.: US 10,394,042 B1
(45) Date of Patent: Aug. 27, 2019

(54) SPATIAL FILTERS WITH HIGH POWER HANDLING CAPABILITIES

(71) Applicant: Lockheed Martin Coherent Technologies, Inc., Louisville, CO (US)

(72) Inventors: Bruce Gregory Tiemann, Longmont, CO (US); Glenn T. Bennett, Boulder, CO (US); Joel Richard Blum, Erie, CO (US)

(73) Assignee: Lockheed Martin Coherent Technologies, Inc., Louisville, CO (US)

( * ) Notice: Subject to any disclaimer, the term of this patent is extended or adjusted under 35 U.S.C. 154(b) by 80 days.

(21) Appl. No.: 15/409,463

(22) Filed: Jan. 18, 2017

Related U.S. Application Data

(60) Provisional application No. 62/280,655, filed on Jan. 19, 2016.

(51) Int. Cl.
*G02B 27/42* (2006.01)
*G02B 27/46* (2006.01)

(52) U.S. Cl.
CPC .................................. *G02B 27/46* (2013.01)

(58) Field of Classification Search
CPC ........... G02B 5/18; G02B 27/44; G02B 27/46
USPC ......................................................... 359/559
See application file for complete search history.

(56) References Cited

U.S. PATENT DOCUMENTS

| 5,001,718 | A | * | 3/1991 | Burrows | H01S 3/005 372/101 |
| 2007/0065068 | A1 | * | 3/2007 | Wang | B82Y 20/00 385/8 |
| 2010/0108913 | A1 | * | 5/2010 | Ershov | H01S 3/225 250/492.1 |
| 2011/0058249 | A1 | * | 3/2011 | Erlandson | H01S 3/0805 359/333 |
| 2011/0299152 | A1 | * | 12/2011 | Mourou | H01S 3/0057 359/327 |

* cited by examiner

*Primary Examiner* — William R Alexander
*Assistant Examiner* — Henry A Duong
(74) *Attorney, Agent, or Firm* — Morgan, Lewis & Bockius LLP

(57) ABSTRACT

An apparatus includes a source configured to generate a beam of electromagnetic radiation propagating in a first direction and a spatial filter. The spatial filter is configured to restrict the beam of electromagnetic radiation in one or more dimensions and includes at least one set of rods including a first rod and a second rod. The first rod is a first cylindrical structure with a first axis in a first plane and the second rod is a second cylindrical structure with a second axis in a second plane parallel to the first plane. The first axis and the second axis are longitudinal axes, and the first and the second rods have shaped surfaces in portions of their respective surfaces facing one another.

20 Claims, 7 Drawing Sheets

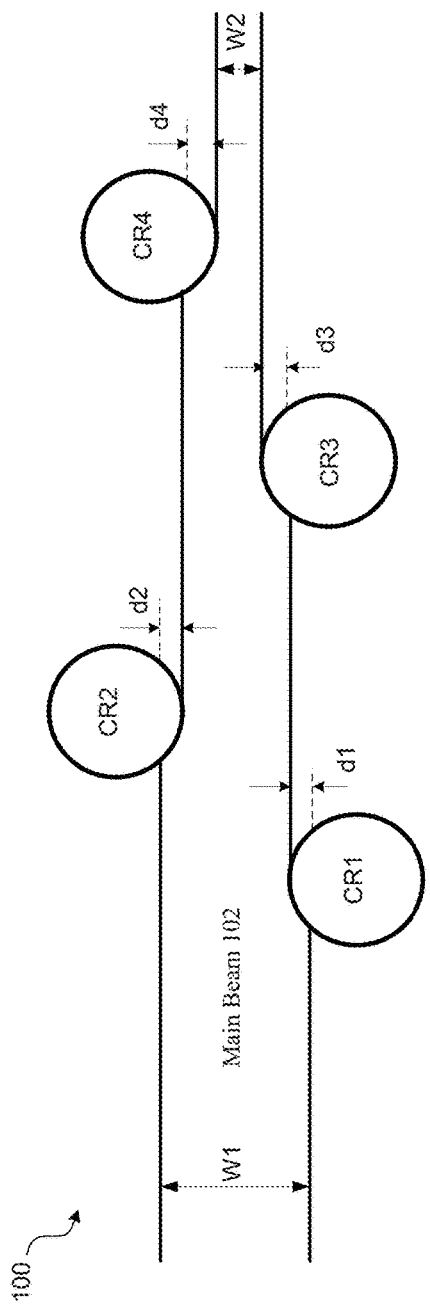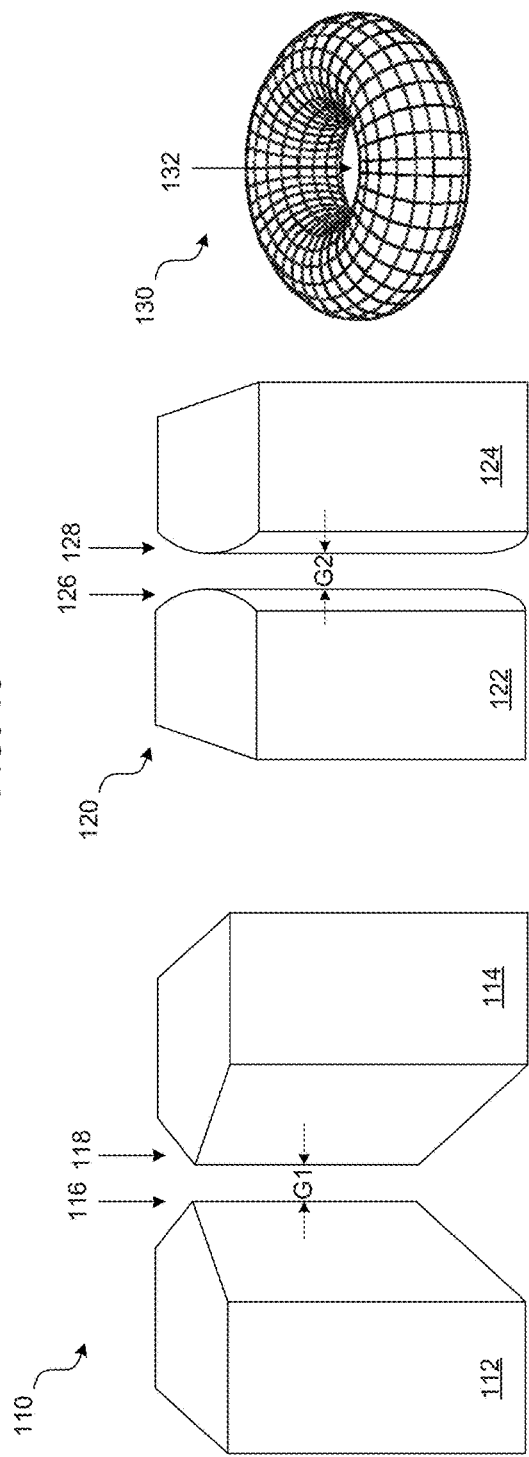

SPATIAL FILTERS WITH HIGH POWER HANDLING CAPABILITIES

CROSS-REFERENCE TO RELATED APPLICATIONS

This application claims the benefit of priority under 35 U.S.C. § 119 from U.S. Provisional Patent Application 62/280,655 filed Jan. 19, 2016, which is incorporated herein by reference in its entirety.

STATEMENT REGARDING FEDERALLY SPONSORED RESEARCH OR DEVELOPMENT

Not applicable

FIELD OF THE INVENTION

The present invention generally relates to optical systems, and more particularly, to spatial filters with high power handling capabilities.

BACKGROUND

Spatial filters are used in laser systems and other optical systems to improve beam quality and/or to restrict the range over which the beam wanders, either in the angle of propagation or in displacement from an intended beam axis. Further, the spatial filters can be used to partially restrict a "focus pull" in which a beam waist translates along the beam propagation direction, and may, for example, come sufficiently close to the location of an optical surface to cause damage. Spatial filters can limit one or two dimensions and can be implemented to produce various aperture shapes, for example, square, rectangular, circular, ovular, or other aperture shapes.

Serious problems may arise when an attempt is made to spatially filter high-power laser beams. Damage can occur to the material constituting the spatial filter itself. For example, when the laser beam is powerful enough, it can melt or evaporate the material constituting the spatial filter. The high power beam can drill new holes wherever it lands and can effectively enlarge the aperture and reduce or eliminate the spatial restriction that the filter was meant to impose. This can limit both the utility and lifetime of the spatial filter, not to mention potentially limiting the lifetime of other nearby optical or electronic components. The nearby optical or electronic components can be damaged or destroyed by the unwanted deposition of the melted or evaporated spatial filter material or scattered incident laser beams. Illustrative components that can be damaged by either route include, for example, vulnerable surfaces of other optics, mounts, and enclosure walls.

In view of the foregoing, spatial filters with improved tolerance toward high-power lasers and other electromagnetic radiation sources would be of significant interest in the art.

SUMMARY

According to various aspects of the subject technology, spatial filters having a non-planar surface at an aperture through which electromagnetic radiation is transmitted are described. In some embodiments, the spatial filters can include opposing whole or partial cylinders that are spaced apart with a gap defined in between. The gap defines an aperture of a desired size for transmitting electromagnetic radiation of a designated beam width.

In some other aspects, an apparatus of the subject technology includes a source configured to generate a beam of electromagnetic radiation propagating in a first direction and a spatial filter. The spatial filter is configured to restrict the beam of electromagnetic radiation in one or more dimensions and includes at least one set of rods including a first rod and a second rod. The first rod is a first cylindrical structure with a first axis in a first plane and the second rod is a second cylindrical shape with a second axis in a second plane parallel to the first plane. The first axis and the second axis are longitudinal axes, and the first and the second rods have shaped surfaces in portions of their respective surfaces facing one another.

In other aspects, an apparatus of the subject technology includes a source configured to generate a beam of electromagnetic radiation propagating in a first direction and a spatial filter. The spatial filter is configured to restrict the beam of electromagnetic radiation in at least two dimension and includes a three dimensional (3D) structure including a hole. The three dimensional structure includes round convex surfaces forming walls of the hole.

In yet other aspects, an optical system of the subject technology includes a laser source configured to generate a beam of laser light propagating in a first direction and a spatial filter. The spatial filter is configured to restrict the beam of laser light in at least one dimension. The spatial filter includes at least a three dimensional (3D) structure or at least one set of rods including a first rod and a second rod. Each of the first rod and the second rod includes a cylindrical rod having at least one round surface along a respective longitudinal axis of the cylindrical rod. The first rod and the second rod are placed having the respective round surfaces facing one another and having a predetermined distance. The 3D structure comprises a torus, and the spatial filter includes a structure partially transparent on the outside.

The foregoing has outlined rather broadly the features of the present disclosure in order that the detailed description that follows can be better understood. Additional features and advantages of the disclosure will be described hereinafter, which form the subject of the claims.

BRIEF DESCRIPTION OF THE DRAWINGS

For a more complete understanding of the present disclosure, and the advantages thereof, reference is now made to the following descriptions to be taken in conjunction with the accompanying drawings describing specific aspects of the disclosure, wherein:

FIG. 10 is a diagram showing an illustrative schematic of a spatial filter incorporating multiple staggered cylindrical rods defining an aperture, according to certain aspects of the disclosure.

FIG. 11 is a diagram showing an illustrative schematic perspective of a spatial filter, according to certain aspects of the disclosure.

FIG. 12 is a diagram showing an illustrative schematic perspective of a spatial filter, according to certain aspects of the disclosure.

FIG. 13 is a diagram showing an illustrative schematic perspective of a toroidal spatial filter, according to certain aspects of the disclosure.

DETAILED DESCRIPTION

Figure 1:
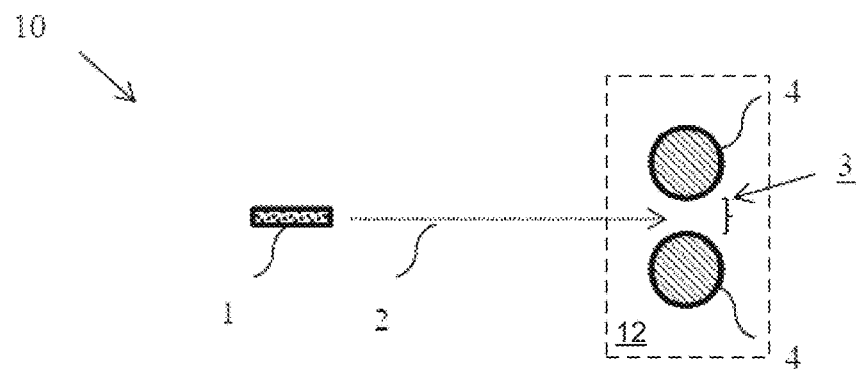
FIG. 1 is a diagram showing an illustrative schematic of an apparatus including a spatial filter incorporating a set of cylindrical rods defining an aperture, according to certain aspects of the disclosure.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and can be practiced using one or more implementations. In one or more instances, well-known structures and components are shown in block diagram form in order to avoid obscuring the concepts of the subject technology.

The present disclosure is directed, in part, to spatial filters having a non-planar surface at the aperture through which electromagnetic radiation is transmitted. More specifically, the spatial filter can include prismatic structures that are spaced apart with a gap defined in between. The gap defines an aperture with a desired size for transmitting electromagnetic radiation of a designated beam width. Depending on configuration, the spatial filters can be configured to limit electromagnetic radiation in one or two dimensions. Optical systems incorporating a spatial filter with a non-planar surface at the aperture of the filter are also described herein. Similarly, methods for limiting the beam width of a laser or other electromagnetic radiation source in an optical system using a spatial filter with a non-polar surface are also described herein.

As discussed above, damage to a surface can arise from excess laser power impinging upon the surface. The resulting thermal load or optical electric field break-down can be associated with melting, evaporation, or plasma formation of the surface, such as that constituting a spatial filter. This can damage the spatial filter and other components of an optical system.

The subject technology incorporates a non-planar surface at the aperture of a spatial filter to significantly enhance thermal tolerance when high-power laser systems are employed. Specifically, the subject disclosure defines the aperture of spatial filters with full or partial cylinders or with prismatic structures, thereby defining a non-planar surface at the gap. This can significantly improve tolerance toward laser heating damage. Advantageously, the disclosed solution can be applied to both one dimensional (1-D) spatial filters (e.g., slit apertures) and two dimensional (2-D) spatial filters (e.g., circular apertures) as discussed in more detail herein.

The spatial filters of the subject disclosure can incorporate various features. Slit aperture spatial filters can include two parallel cylindrical elements with a gap defined in between. The gap makes the active aperture of the filter. In alternative embodiments, the cylindrical elements can be replaced by prismatic structures, such as opposing triangular prisms meeting at their apex, as discussed further detail herein. However, it may be in some cases more desirable to choose rounded surfaces to avoid field concentration at the edges of two prisms. In some instances, the material constituting the cylindrical elements can be optically transparent (e.g., sapphire). In still other instances, the cylinders or prismatic structures can be tipped back by rotating the assembly by a sufficient amount in the plane defined by the optical propagation direction and also parallel to the axes of the two cylinders. By tipping back the assembly, reflections can be caused to be out-of-plane with respect to the incident and transmitted light. Spatial filters based on structures other than cylinders are also disclosed herein.

Although the following description is primarily directed toward 1-D slit filters, it is to be understood that related 2-D circular filters can be constructed by appropriate extension of the described structures. For example, 2-D circular filters can be formed by rotation of the 1-D slit filters, or by successively attacking other spatial components of a beam with additional 1-D slit filters. Such extension can be readily conceived by one having ordinary skill in the art given the benefit of the present disclosure and is described in more detail below.

FIG. 1 is a diagram showing an illustrative schematic of an apparatus 10 including a spatial filter 12 incorporating a set of cylindrical rods 4 defining an aperture 3, according to certain aspects of the disclosure. The apparatus 10 includes a source 1 of electromagnetic radiation (e.g., light, such as laser light) and the spatial filter 12 that is formed by a set of cylindrical rods 4. The source 1 generates an electromagnetic radiation beam 2, which is filtered by the spatial filter 12. The cylindrical rods 4, as shown by their cross sections in FIG. 1, are circular cylindrical rods that are placed at a distance (e.g., 200-300 microns) from each other, the distance defines the aperture 3. Example diameters of the cylindrical rods are within the range of 3-5 mm. The aspect ratio (e.g., length/diameter) of the cylindrical rod used in the spatial filter of the subject technology is within the range of about 20-30.

If the cylindrical rods have a sufficiently large diameter, the round surface of the spatial filter allows that electromagnetic radiation missing the gap and hitting the filter material impinge at a glancing angle on a cylinder surface. The glancing angle significantly reduces the amount of damage caused by the high power beam on the material of the spatial filter. This is because with a glancing angle of incidence, the errant light is spread over a much larger surface area, thereby reducing the intensity and the consequent thermal loading. Thus, the chance for thermal damage can be decreased.

Depending upon whether the material of the spatial filter (e.g., cylindrical rods 4) is specular or diffuse reflective, scattered electromagnetic radiation can travel in different directions. Although absorptive surfaces generate less stray light, material heating is the least when absorption is minimized. Hence, it can be desirable to utilize generally non-absorptive materials, although they can be incorporated in some instances. Diffuse surfaces scatter light in essentially all directions, including along, or nearly along, the intended beam direction, which is sometimes undesired. In some embodiments, a specular reflective material can constitute the cylinders. Particularly when specular reflection is employed, the cylinders can be tipped at an angle (e.g., tipped backwards) as discussed further herein, so that the impinging electromagnetic radiation scatters above and below the beam plane, instead of in-plane (where it can potentially be more problematic).

The cylinders can be made of a transparent or substantially transparent material in some embodiments. While doing so results in near-maximal generation of stray light, transparent surfaces are less lossy (absorptive) than metal or other strongly absorbing surfaces, and therefore are more resistant to thermal effects and optical damage. Hence, transparent materials can continue to operate at higher power levels which would damage or destroy absorbing or even reflecting surfaces.

In some embodiments, the cylinder surfaces can be coated, such as with single-layer or multi-layer dielectric coatings. Although coated surfaces do not necessarily have higher damage thresholds than super-polished substrates have, some coatings obtain their optical properties by resonantly enhancing internal optical fields. However, this feature may not be desirable at the upper limits of optical damage resistance. In some embodiments, uncoated surfaces can end up having the highest ultimate damage resistance.

In one or more embodiments, the material used for the spatial filter can include an optical material (e.g., glass, sapphire, quartz, transparent diamond, and the like), a metal (e.g., gold, titanium, stainless steel, and the like), an exotic thermal material, a refractory material, or material with high thermal conductivity. The spatial filter can be partially transparent on the outside and include one or more internal layers including an absorptive material, in some embodiments.

Figure 2:
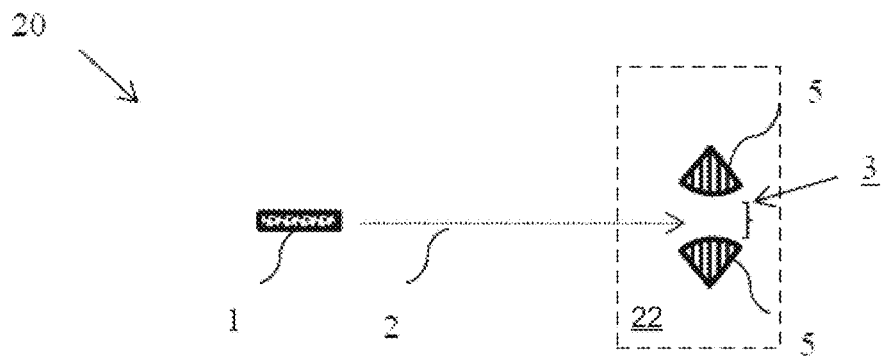
FIG. 2 is a diagram showing an illustrative schematic of an apparatus including a spatial filter incorporating segments of cylindrical rods of FIG. 1 defining an aperture, according to certain aspects of the disclosure.

FIG. 2 is a diagram showing an illustrative schematic of an apparatus 20 including a spatial filter 22 incorporating segments of cylindrical rods 4 of FIG. 1 defining an aperture, according to certain aspects of the disclosure. The apparatus 20 includes the source 1 of electromagnetic radiation (e.g., light, such as laser light) and the spatial filter 22 that is formed by cylindrical rods 5. The source 1 generates the electromagnetic radiation beam 2 which is filtered by the spatial filter 22. The cylindrical rods 5, as shown by their cross sections in FIG. 2, are segments of circular cylindrical rods that are placed at a distance (e.g., 200-300 microns) from each other, the distance defines the aperture 3. In terms of dimensions (e.g. radius and length) and material composition, the cylindrical rods 5 are similar to the cylindrical rods 4 of FIG. 1, as discussed above.

It is understood that in the case of large-radius cylinders, the cylinders do not need to be complete in the radial direction in order to accomplish the foregoing effect. In some embodiments, the segment of cylindrical rod as defined by its cross section (e.g., an arc or wedge of a cylinder) can be used for the spatial filter 22, as shown in FIG. 2, to accomplish an effect similar to that described above. That is, sections of the cylinder not having electromagnetic radiation impinging upon them can optionally be absent in the spatial filters described herein in order to reduce the amount of material used. In some embodiments, the cylinder section can be a small cylindrical lens with a desired radius of curvature on the cylindrical surface facing the beam 2 to be filtered. Given that the allowable radius of curvature can be large and the cylinders do not have to be complete, in some embodiments, plano-convex cylinder lenses can be used. The plano-convex cylinder lenses can be arranged with the cylindrical surfaces facing each other across a narrow gap (e.g., 3).

Figure 3:
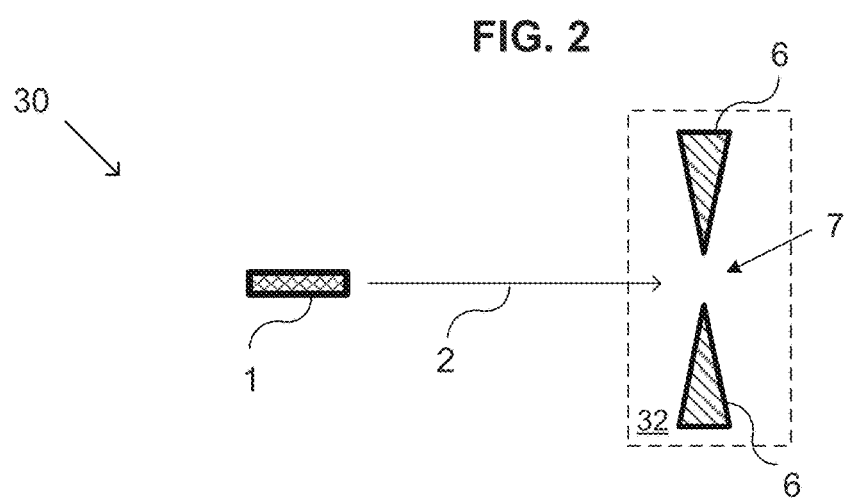
FIG. 3 is a diagram showing an illustrative schematic of an apparatus including a spatial filter incorporating a set of wedge-shape cylindrical rods defining an aperture, according to certain aspects of the disclosure.

FIG. 3 is a diagram showing an illustrative schematic of an apparatus 30 including a spatial filter 32 incorporating a set of wedge-shape cylindrical rods 6 defining an aperture 7, according to certain aspects of the disclosure. The apparatus 30 includes the source 1 of electromagnetic radiation (e.g., light, such as laser light) and the spatial filter 32 that is formed by the wedge-shape cylindrical rods 6. The source 1 generates the electromagnetic radiation beam 2, which is filtered by the spatial filter 32. The wedge-shape cylindrical rods 6 provide slanted surfaces that allow the electromagnetic radiation missing the aperture 7 and hitting the filter material impinge at a glancing angle on slanted surfaces. The glancing angle can reduce the amount of damage caused by the high power beam on the material of the spatial filter, as the errant rays of the beam are spread over a larger surface area, thereby reducing the intensity and the consequent thermal loading. Accordingly, the chance for thermal damage can be decreased. The material composition the wedge-shape cylindrical rods 6 are similar to the cylindrical rods 4 of FIG. 1, as discussed above.

Figure 4:
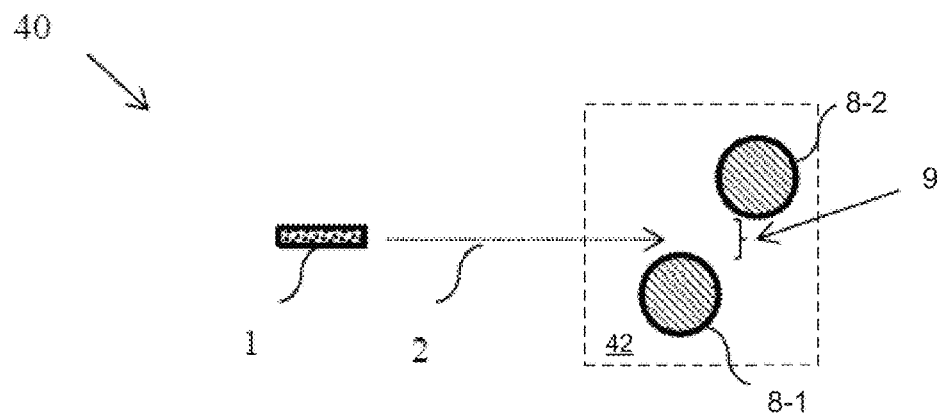
FIG. 4 is a diagram showing an illustrative schematic of an apparatus including a spatial filter incorporating a set of staggered cylindrical rods defining an aperture, according to certain aspects of the disclosure.

FIG. 4 is a diagram showing an illustrative schematic of an apparatus 40 including a spatial filter 42 incorporating a set of staggered cylindrical rods 8 (e.g., 8-1 and 8-2) defining an aperture 9, according to certain aspects of the disclosure. The apparatus 40 includes the source 1 of electromagnetic radiation (e.g., light, such as laser light) and the spatial filter 42 that is formed by staggered cylindrical rods 8. The source 1 generates the electromagnetic radiation beam 2, which is filtered by the spatial filter 42. The staggered cylindrical rods 8 include a first cylindrical rod 8-1 and a second cylindrical rod 8-2, which are placed at different distances with respect to the source 1. The second cylindrical rod 8-2 being placed at an offset with respect to the cylindrical rod 8-1 can remove more errant rays by deflection than if it were placed opposite to the cylindrical rod 8-1. The dimensions and material composition of the cylindrical rods 8 are similar to the cylindrical rods 4 of FIG. 1, as discussed above.

Figure 5:
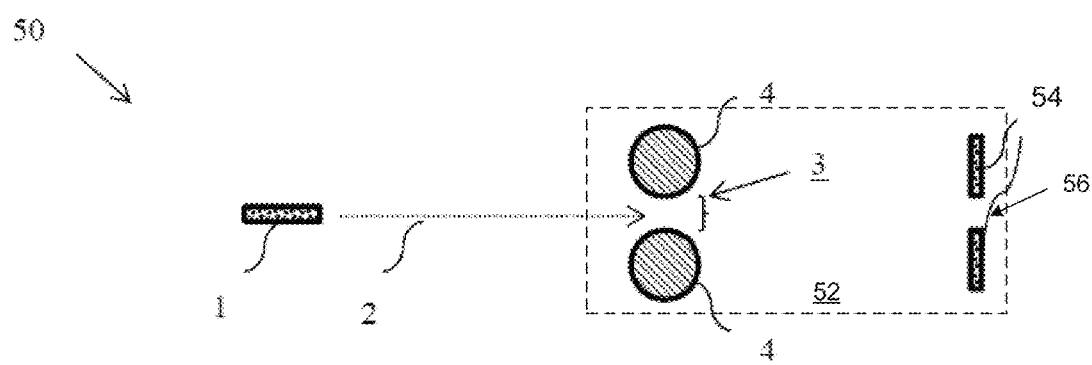
FIG. 5 is a diagram showing an illustrative schematic of an apparatus including a spatial filter incorporating a set of cylindrical rods and a downstream slit defining an aperture, according to certain aspects of the disclosure.

FIG. 5 is a diagram showing an illustrative schematic of an apparatus 50 including a spatial filter 52 incorporating a set of cylindrical rods 4 and a downstream slit 54 defining an aperture 56, according to certain aspects of the disclosure.

The apparatus 50 includes the source 1 of electromagnetic radiation (e.g., light, such as laser light) and the spatial filter 52 that is formed by cylindrical rods 4 and the slit 54. The source 1 generates the electromagnetic radiation beam 2, which is filtered by the spatial filter 52. The cylindrical rods 4 similar to the cylindrical rods 4 of FIG. 1, as discussed above. The slit 54 can be a conventional slit, as the beam power, when reaching the slit 54 is substantially reduced by the cylindrical rods 4, and is not damaging to the material of the slit 54. The distance between the slit 54 and the cylindrical rods 4 depend on the application and the dimensions of the cylindrical rods 4. The material composition of the slit 54 can be similar to the cylindrical rods 4 of FIG. 1 discussed above. However, the material of the slit 54 can be more absorptive, as the beam impinging on it is less powerful.

Figure 6:
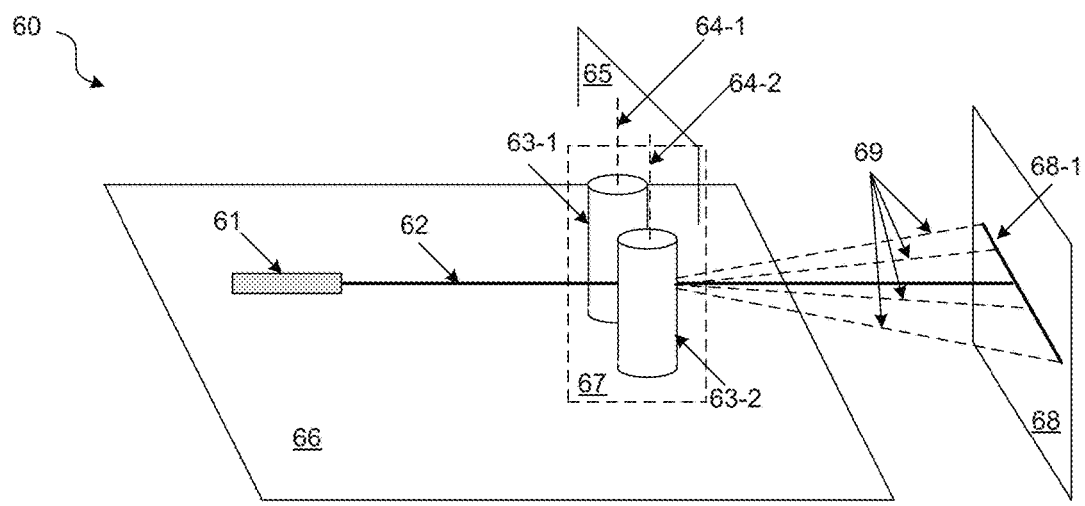
FIG. 6 is a diagram showing an illustrative schematic perspective of an apparatus including a spatial filter incorporating a set of cylindrical rods defining an aperture, according to certain aspects of the disclosure.

FIG. 6 is a diagram showing an illustrative schematic perspective of an apparatus 60 including a spatial filter 67 incorporating a set of cylindrical rods 63 defining an aperture, according to certain aspects of the disclosure. The apparatus 60 includes the source 61 of electromagnetic radiation (e.g., light, such as laser light) and the spatial filter 67 that is formed by a set of cylindrical rods 63. The source 61 generates the electromagnetic radiation beam 62, which is filtered by the spatial filter 67. The set of cylindrical rods 63 includes a first cylindrical rod 63-1 and a second cylindrical rod 63-2, with respective longitudinal axes 64-1 and 64-2.

In some embodiments, cylindrical rods 63 are similar to the cylindrical rods 4 of FIG. 1, for which the dimensions and material were discussed above. The first cylindrical rod 63-1 and a second cylindrical rod 63-2 are positioned such that their respective longitudinal axes 64-1 and 64-2 are in a plane 65, which is perpendicular to a reference plane 66. The reference plane 66 is the plane of a mounting surface (e.g., a board) on which the apparatus 60 (e.g., an optical apparatus) is mounted. In the embodiment shown in FIG. 6, the longitudinal axes 64 are perpendicular to the reference plane 66. It is understood that in the embodiment shown in FIG. 6, the scattered light as represented by rays 69 can cause interference with the main beam 62 as the locus of the scattered light rays 69, as shown by a line 68-1 on a screen 68, are in the same plane with the beam 62.

Figure 7:
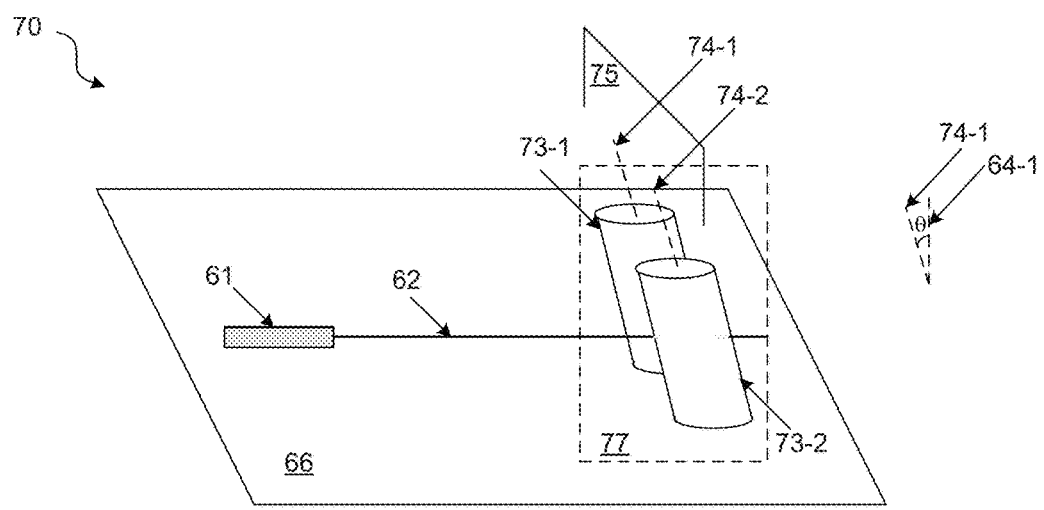
FIG. 7 is a diagram showing an illustrative schematic perspective of an apparatus including a spatial filter incorporating a set of slanted cylindrical rods defining an aperture, according to certain aspects of the disclosure.

FIG. 7 is a diagram showing an illustrative schematic perspective of an apparatus 70 including a spatial filter 77 incorporating a set of slanted cylindrical rods 73 defining an aperture, according to certain aspects of the disclosure. The apparatus 70 includes the source 61 of electromagnetic radiation and the spatial filter 77 that is formed by a set of cylindrical rods 73. The source 61 generates the electromagnetic radiation beam 62, which is filtered by the spatial filter 77. The set of cylindrical rods 73 includes a first cylindrical rod 73-1 and a second cylindrical rod 73-2, with respective longitudinal axes 74-1 and 74-2.

In some embodiments, cylindrical rods 73 are similar to the cylindrical rods 4 of FIG. 1, for which the dimensions and material were discussed above. The first cylindrical rod 73-1 and the second cylindrical rod 73-2 are positioned such that their respective longitudinal axes 74-1 and 74-2 are in a plane 75, which is perpendicular to the reference plane 66. The reference plane 66 is the plane of a mounting surface (e.g., a board) on which the apparatus 70 (e.g., an optical apparatus) is mounted. The longitudinal axes 74-1 and 74-2 of the slanted cylindrical rods 73 are not perpendicular to the reference plane 66 and have a tilt angle $\theta$ with respect to the longitudinal axes 64-1 and 64-2 of cylindrical rods 63 of FIG. 6.

It is understood that in the embodiment shown in FIG. 7 has an advantageous feature with respect to the embodiment shown in FIG. 6. The advantageous feature is that the amount of the scattered light that can cause interference with the main beam 62 is reduced, as a locus of the scattered light rays is no longer in-plane with the main beam 62.

Figure 8:
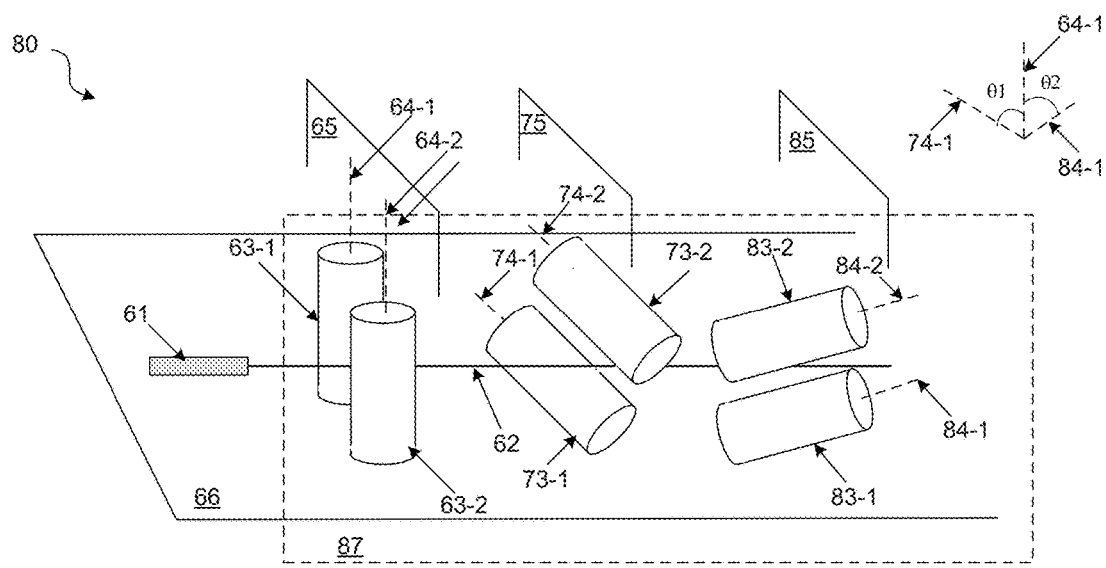
FIG. 8 is a diagram showing an illustrative schematic perspective of an apparatus including a spatial filter incorporating multiple sets of cylindrical rods defining an aperture, according to certain aspects of the disclosure.

FIG. 8 is a diagram showing an illustrative schematic perspective of an apparatus 80 including a spatial filter 87 incorporating multiple sets of cylindrical rods defining an aperture, according to certain aspects of the disclosure. The apparatus 80 includes the source 61 of electromagnetic and the spatial filter 87 that is formed by a number of sets of cylindrical rods forming a helical arrangement. The source 61 generates the electromagnetic radiation beam 62, which is filtered by the spatial filter 87. The sets of cylindrical rods include a first set (e.g., cylindrical rods 63), a second set (e.g., cylindrical rods 73), and a third set of cylindrical rods 83 and is not limited to three sets and can include further cylindrical rods. The cylindrical rods 63 and 73 are similar to the cylindrical rods 63 and 73 of FIGS. 6 and 7, respectively. The axes of the cylindrical rods 73 (e.g., 74-1 and 74-2) are at an angle $\theta 1$ (e.g., 90 degrees) with respect to the axes of the cylindrical rods 33 (e.g., 64-1 and 64-2). The third set of cylindrical rods 83 includes cylindrical rods 83-1 and 83-2, the longitudinal axes 84-1 and 84-2 of which are in a plane 85 and are at an angle $\theta 2$ with respective longitudinal axes 64-1 and 64-2, as shown in FIG. 8. The plane 85 is parallel to the planes 65 and 75 and is perpendicular to the reference plane 66. The cylindrical rods 83-1 and 83-2 are similar to the cylindrical rods 63-1 and 63-2, in terms of both the structural material and dimensions. In some embodiments, there can be other sets of cylindrical rods (not shown for simplicity), with their respective axes making different angles with respect to the longitudinal axes 64-1 and 64-2, for example, to create a hexagonal diaphragm or other polygonal diaphragm shapes. In the embodiment shown in FIG. 8, the scattered light is filtered multiple times from different angles and the spatial filter can work as a polygonal aperture filter.

Figure 9:
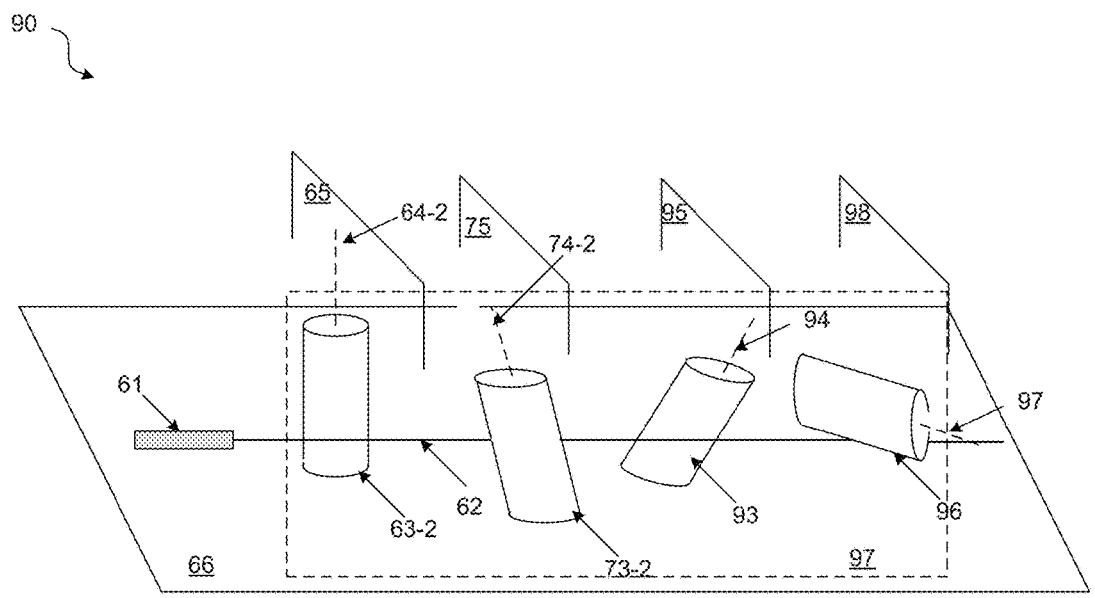
FIG. 9 is a diagram showing an illustrative schematic perspective of an apparatus including a spatial filter incorporating multiple cylindrical rods defining an aperture, according to certain aspects of the disclosure.

FIG. 9 is a diagram showing an illustrative schematic perspective of an apparatus 90 including a spatial filter 97 incorporating multiple cylindrical rods defining an aperture, according to certain aspects of the disclosure. The apparatus 90 includes the source 61 of electromagnetic and the spatial filter 97 that is formed by a number of cylindrical rods forming a helical arrangement. The respective longitudinal axes of the cylindrical rods are in parallel planes that are perpendicular to the reference plate 66 and are at different angles with respect to one another. For example, first and second cylindrical rods 63-2 and 73-2 are as shown in FIG. 8 and are at different sides of the beam 62, and cylindrical rods 93 and 96 are further rotated with respect to the cylindrical rods 63-2. Although FIG. 9 shows only four cylindrical rods, but the subject technology is not limited to four cylindrical rods and can include fewer or greater number of rods, possibly including an odd number of rods, not arranged in pairs. In the embodiment shown in FIG. 9, the scattered light is filtered multiple times from different angles and the spatial filter works as a polygonal aperture filter.

In some embodiments, the cylindrical rods of the spatial filter 97 can have similar dimensions and structural materials as discussed above with respect to the special filter 67 of FIG. 6. In some embodiments, some or all of the cylindrical rods of the spatial filter 97 can be segments of cylinders as shown in FIG. 2. In some embodiments, some or all of the cylindrical rods of the spatial filter 97 can be similar to the cylindrical rods 6 of FIG. 3.

FIG. 10 is a diagram showing an illustrative schematic of a spatial filter 100 incorporating multiple staggered cylindrical rods defining an aperture, according to certain aspects of the disclosure. The spatial filter 100 includes cylindrical rods CR1 through CR4 (shown in a top view), which are placed at different positions with respect to a source of electromagnetic radiation (not shown for simplicity). Each of the cylindrical rods CR1 through CR4 has a respective interception (e.g., d, such as d1, d2, d3, and d4) with the main beam 102 of electromagnetic radiation (e.g., laser light), such that the beam width is reduced from an original width of W1 to a smaller width of W2 after passing through the spatial filter 100. The number of staggered cylindrical rods of the spatial filter 100 is not limited to four and can be more or less based on the power of the laser beam, possibly including an odd number of rods. With higher power beams, the number of staggered cylindrical rods can be increased to further dilute the optical power impacting upon any individual cylinder and thereby increasingly constricting the beam, as desired.

In some embodiments, the cylindrical rods of the spatial filter 100 can have similar dimensions and structural materials as discussed above with respect to the special filter 67 of FIG. 6. In some embodiments, some or all of the cylindrical rods of the spatial filter 97 can be segments of cylinders as shown in FIG. 2. In some embodiments, some or all of the cylindrical rods of the spatial filter 97 can be similar to the cylindrical rods 6 of FIG. 3.

FIG. 11 is a diagram showing an illustrative schematic perspective of a spatial filter 110, according to certain aspects of the disclosure. The spatial filter 110 shown in FIG. 11 has a roof top structure and is similar to the spatial filter 32 of FIG. 3. The spatial filter 110 includes cylindrical rods 112 and 114 that are facing each other with a gap G1 between edges 116 and 118 of the roof-top structures. The cylindrical rods 112 and 114 can replace some or all of the cylindrical rods of different embodiments of the subject technology described with respect to FIGS. 3 through 10. The cylindrical rods 112 and 114 of the spatial filter 110 can be made of similar materials as discussed above with respect to FIG. 1.

FIG. 12 is a diagram showing an illustrative schematic perspective of a spatial filter 120, according to certain aspects of the disclosure. The spatial filter 120 includes cylindrical rods 122 and 124 having a round (e.g., circular or oval shape) surface at on side. The cylindrical rods 122 and 124 are placed to face each other with a gap G2 between edges 126 and 128 of the round surfaces. The cylindrical rods 122 and 124 can replace some or all of the cylindrical rods of different embodiments of the subject technology described with respect to FIGS. 3 through 10. The cylindrical rods 122 and 124 of the spatial filter 120 can be made of similar materials as discussed above with respect to FIG. 1.

FIG. 13 is a diagram showing an illustrative schematic perspective of a toroidal spatial filter 130, according to certain aspects of the disclosure. The toroidal spatial filter 130 can be made of similar materials as discussed above with respect to FIG. 1. The opening (hole) 132 of the toroidal spatial filter 130 can constrict an electromagnetic radiation (e.g., laser light) beam in all peripheral angles of the beam and a three-dimensional version of a pin-hole aperture, that can be used for high power beams. In some embodiments, the outside (e.g., outside the hole 132) surfaces of the spatial filter 130 does not need to be round and can be flat, for example. In some embodiments, spatial filters with similar functionalities can be constructed by creating a hole similar to the hole 132 in a slab of the same material as used for the toroidal spatial filter 130.

Figure 14:
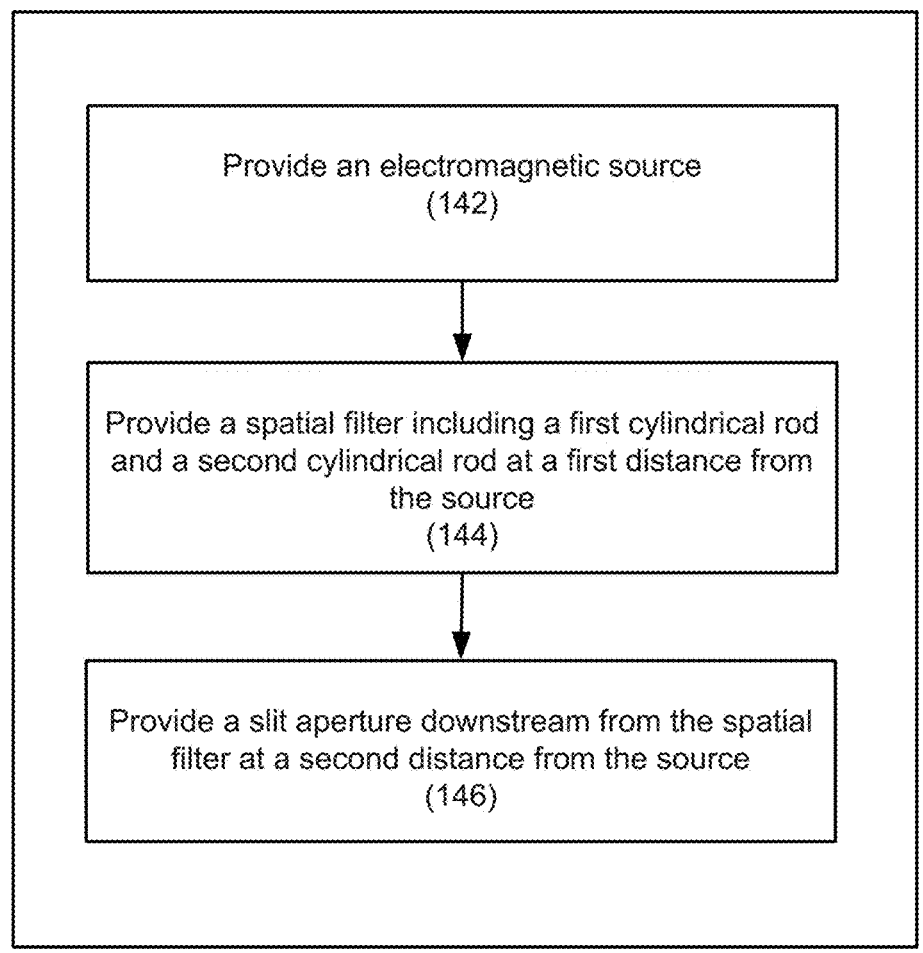
FIG. 14 is a flow diagram illustrating an example method of providing a spatial filter, according to certain aspects of the disclosure.

FIG. 14 is a flow diagram illustrating an example method 140 of providing a spatial filter (e.g., 52 of FIG. 5), according to certain aspects of the disclosure. The method 140 begins with providing an electromagnetic radiation source (e.g., a laser such as 1 of FIG. 1 or 61 of FIG. 6) (142). A spatial filter (e.g., 12 of FIG. 1 or 67 of FIG. 6) is provided that includes a first cylindrical rod (e.g., 63-1 of FIG. 6) and a second cylindrical rod (e.g., 63-2 of FIG. 6) at a first distance from the source (144). A slit aperture (e.g., 54 of FIG. 5) can be provided downstream from the spatial filter at a second distance from the source (146).

Figure 15A:
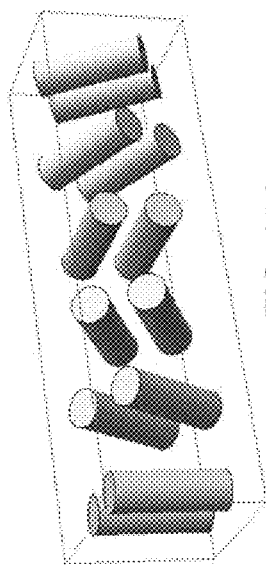
FIGS. 15A thorough 15F are diagrams showing illustrative perspective views of the spatial filters of FIGS. 8 and 9 and corresponding effective apertures, according to certain aspects of the disclosure.
Figure 15B:
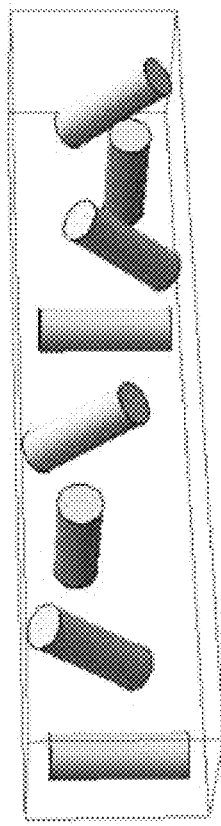
Figure 15C:
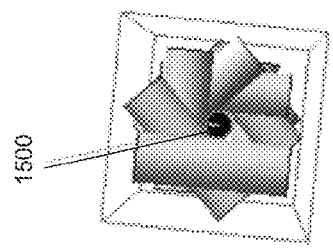
Figure 15D:
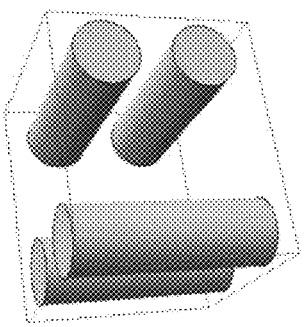
Figure 15E:
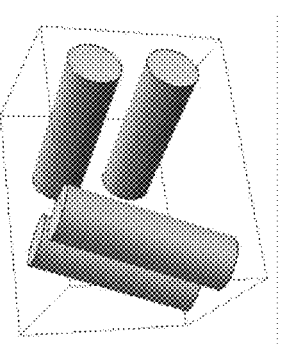
Figure 15F:
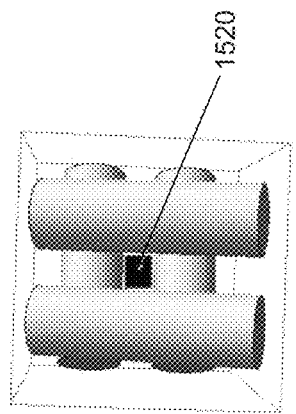

FIGS. 15A thorough 15F are diagrams showing illustrative perspective views of the spatial filters of FIGS. 8 and 9 and corresponding effective apertures, according to certain aspects of the disclosure. The artistically drawn perspective views are shown to assist with better understanding the subject technology. For example, FIGS. 15A and 15B gives more clear views of FIGS. 8 and 9 discussed in details above, and FIG. 15C illustrates an effective octagonal aperture 1500 formed by the rods of FIG. 15B. FIGS. 15D and 15E illustrate perspective views of 4 rods in two pair arrangements, without and with tilt, respectively. The axes of the tilted rods are no longer perpendicular to the beam direction. FIG. 15 F shows a top perspective view of FIG. 15D illustrating a corresponding effective square aperture 1520.

The description of the subject technology is provided to enable any person skilled in the art to practice the various aspects described herein. While the subject technology has been particularly described with reference to the various figures and aspects, it should be understood that these are for illustration purposes only and should not be taken as limiting the scope of the subject technology.

A reference to an element in the singular is not intended to mean "one and only one" unless specifically stated, but rather "one or more." The term "some" refers to one or more. Underlined and/or italicized headings and subheadings are used for convenience only, do not limit the subject technology, and are not referred to in connection with the interpretation of the description of the subject technology. All structural and functional equivalents to the elements of the various aspects described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

Although the invention has been described with reference to the disclosed aspects, one having ordinary skill in the art will readily appreciate that these aspects are only illustrative of the invention. It should be understood that various modifications can be made without departing from the spirit of the invention. The particular aspects disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative aspects disclosed above may be altered, combined, or modified and all such variations are considered within the scope and spirit of the present invention. While compositions and methods are described in terms of "comprising," "containing," or "including" various components or steps, the compositions and methods can also "consist essentially of" or "consist of" the various components and operations. All numbers and ranges disclosed above can vary by some amount. Whenever a numerical range with a lower limit and an upper limit is disclosed, any number and any subrange falling within the broader range are specifically disclosed. Also, the terms in the claims have their plain, ordinary meaning unless otherwise explicitly and clearly defined by the patentee. If there is any conflict in the usages of a word or term in this specification and one or more patent or other documents that may be incorporated herein by reference, the definitions that are consistent with this specification should be adopted.

What is claimed is:

1. An apparatus comprising:
a source configured to generate a beam of electromagnetic radiation propagating in a first direction; and
a spatial filter configured to restrict the beam of electromagnetic radiation in at least one dimension, the spatial filter including at least one set of rods comprising at least a first rod and a second rod, the first rod being formed in a first cylindrical structure with a first axis in a first plane and the second rod being formed in a second cylindrical structure with a second axis in a second plane parallel to the first plane,
wherein the first axis and the second axis comprise longitudinal axes, and wherein the first and the second rods have non-planar shaped surfaces in at least portions of respective surfaces of the first and second rods facing one another, the electromagnetic radiation configured to propagate between the non-planar shaped surfaces of the first and second rods.

2. The apparatus of claim 1, wherein the source comprises a high-power laser source, and wherein the source is configured to generate laser pulses with a power level of at least 10 milli-Joules.

3. The apparatus of claim 1, wherein the shaped surfaces comprise round surfaces, and wherein the round surfaces have a circular or oval cross section.

4. The apparatus of claim 1, wherein the shaped surfaces comprise surfaces having a wedge shape cross section.

5. The apparatus of claim 1, wherein the respective surfaces of the first and second rods facing one another are at a predetermined distance from one another at respective closest facing points, and wherein the first and the second rods are configured to restrict the beam of electromagnetic radiation in the at least one dimension to the predetermined distance, wherein the predetermined distance is within a range of about 200-300 microns.

6. The apparatus of claim 1, wherein the first axis and the second axis are parallel with a reference direction, the first plane and the second plane overlap and are perpendicular to a reference plane, and the reference direction is perpendicular to the reference plane, wherein the reference plane is a mounting plane of the apparatus.

7. The apparatus of claim 6, wherein the first axis and the second axis are tilted with respect to the first reference direction.

8. The apparatus of claim 1, wherein the at least one set of rods comprises a plurality of sets of rods, wherein respective planes of the plurality of sets of rods are parallel with one another and are being positioned at different distances from the source, and wherein rods of each set of rods of the plurality of sets of rods are parallel with each other and respective sets of rods of the plurality of sets of rods are configured at different angular positions in their respective planes forming a helical arrangement.

9. The apparatus of claim 1, wherein the at least one set of rods comprises a plurality of rods, wherein respective planes of the plurality of rods are parallel with one another and are being positioned at different distances from the source, and wherein respective longitudinal axes of the plurality of rods are parallel and perpendicular to a mounting plane of the apparatus.

10. The apparatus of claim 9, wherein rods of the plurality of rods are configured at different angular positions in their respective planes forming a helical arrangement.

11. The apparatus of claim 1, wherein the at least one set of rods comprise the first and the second rods in the first plane and a planar slit in a plane positioned farther from the source with respect to the first plane.

12. The apparatus of claim 1, wherein the first plane and the second plane are at different distances from the source.

13. The apparatus of claim 1, wherein rods of the at least one set of rods comprise material that are slightly absorptive.

14. The apparatus of claim 1, wherein rods of the at least one set of rods comprise structures at least partially transparent on the outside and including one or more internal layers comprising an absorptive material.

15. The apparatus of claim 1, wherein rods of the at least one set of rods comprise at least one of an optical material, a metal, an exotic thermal material, a refractory material, or material with high thermal conductivity.

16. The apparatus of claim 1, wherein rods of the at least one set of rods comprise uncoated sapphire rods having diameters within a range of about 3-5 mm and aspect ratios within a range of about 20-30.

17. An apparatus comprising:
a source configured to generate a beam of electromagnetic radiation propagating in a first direction; and
a spatial filter configured to restrict the beam of electromagnetic radiation in at least two dimensions and comprising a three dimensional (3D) structure including a hole, wherein the 3D structure comprises round convex surfaces forming walls of the hole.

18. The apparatus of claim 17, wherein the 3 D structure comprises a geometrical shape formed by rotation of a two dimensional (2D) shape, wherein the 2D shape has at least one round side, and wherein the 2D shape comprises a circle and the 3D shape comprises a torus.

19. The apparatus of claim 17, wherein the 3D structure comprises at least one of an optical material, a metal, an exotic thermal material, a refractory material, or material with high thermal conductivity, wherein the 3D structure comprises a structure at least partially transparent on the outside and including one or more internal layers comprising an absorptive material.

20. An optical system comprising:
a laser source configured to generate a beam of laser light propagating in a first direction; and
a spatial filter configured to restrict the beam of laser light in at least one dimension, the spatial filter comprising at least one of a three dimensional (3D) structure or at least one set of rods comprising at least a first rod and a second rod,
wherein each of the first rod and the second rod comprises a cylindrical rod having at least one round surface along a respective longitudinal axis of the cylindrical rod, and wherein the first rod and the second rod are placed having the respective round surfaces facing one another and having a predetermined distance, wherein the 3D structure comprises a torus having a central opening to constrict the beam of laser light in all peripheral angles of the beam, and wherein the spatial filter comprises a structure at least partially transparent on the outside.

* * * * *